March 31, 1959
D. B. WHEELER
2,879,554
HEAT REFLECTIVE INSULATION
Filed Nov. 28, 1958
4 Sheets-Sheet 1
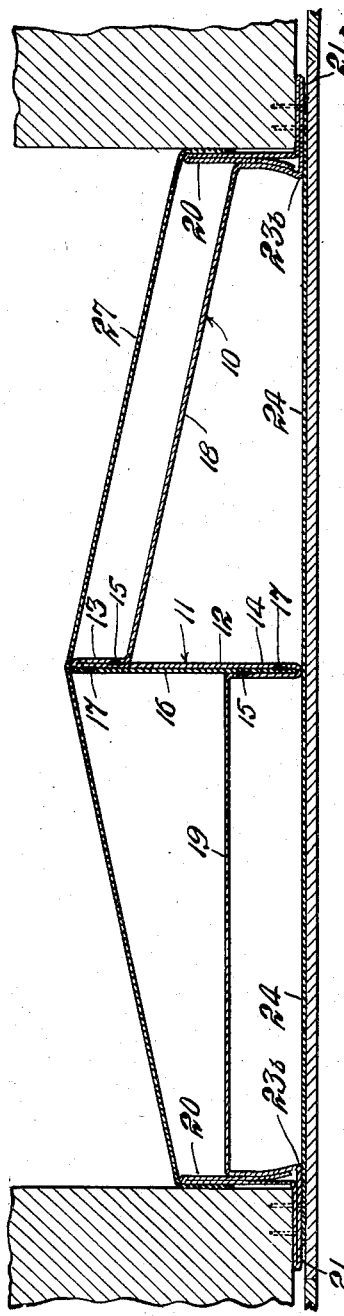
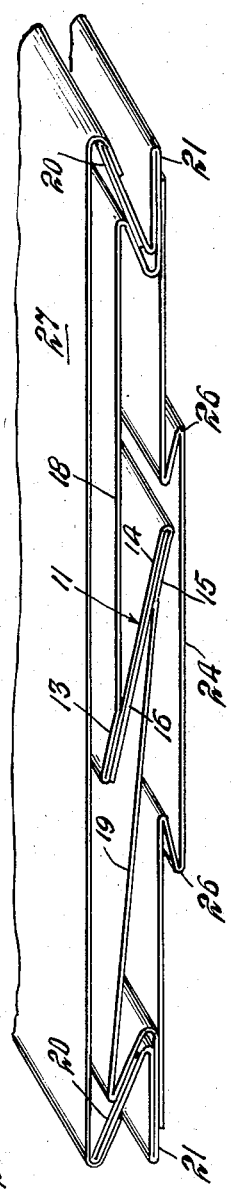
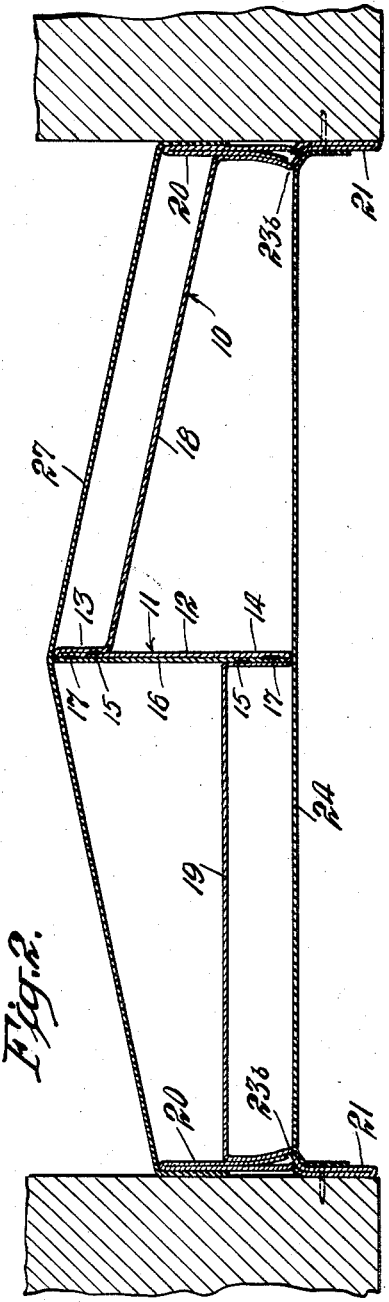
INVENTOR.
DONALD B. WHEELER
BY
Charles P. Bauer
ATTORNEY March 31, 1959　　　D. B. WHEELER　　　2,879,554
HEAT REFLECTIVE INSULATION
Filed Nov. 28, 1958　　　　　　　　　　　　4 Sheets-Sheet 2
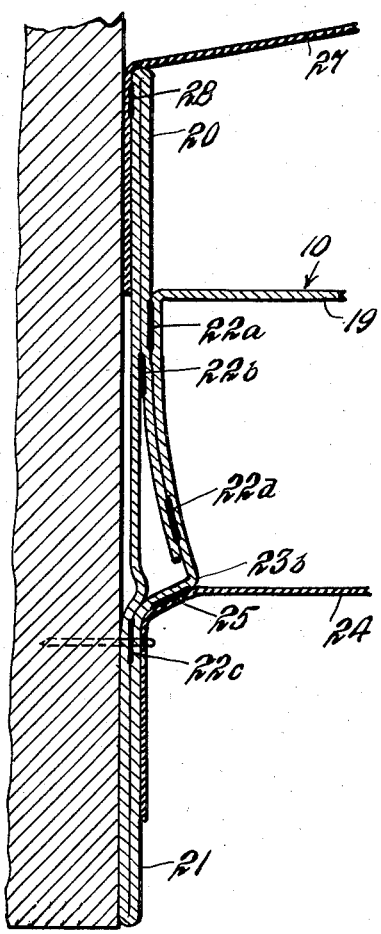
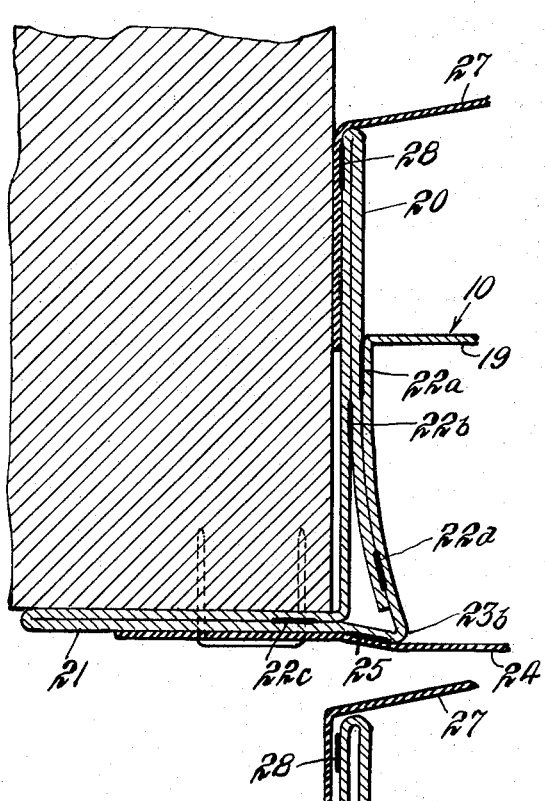
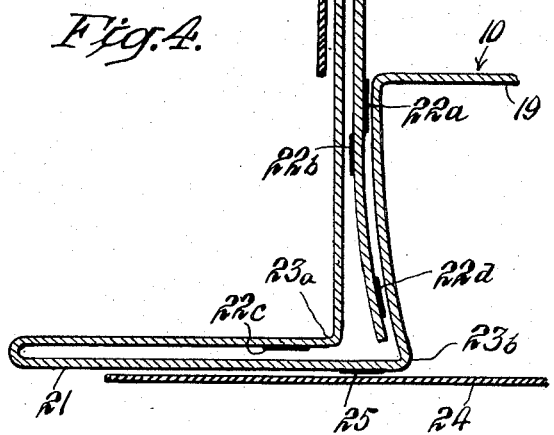
INVENTOR.
DONALD B. WHEELER
BY
Charles P. Bauer
ATTORNEY

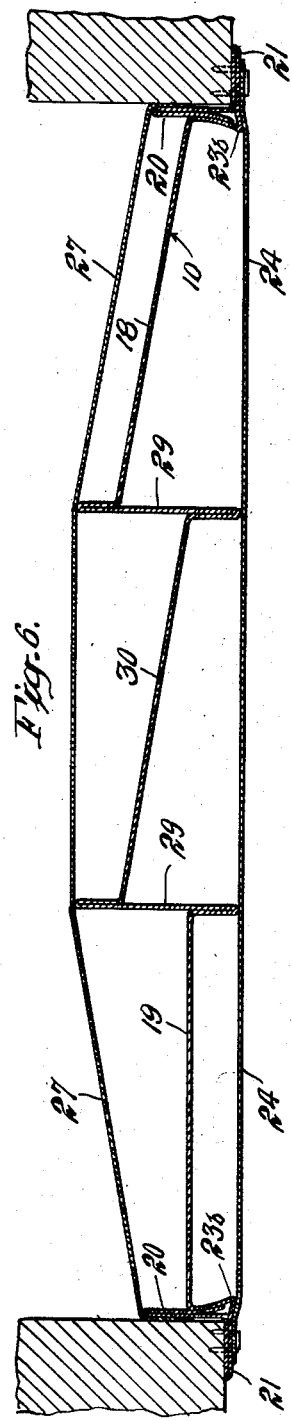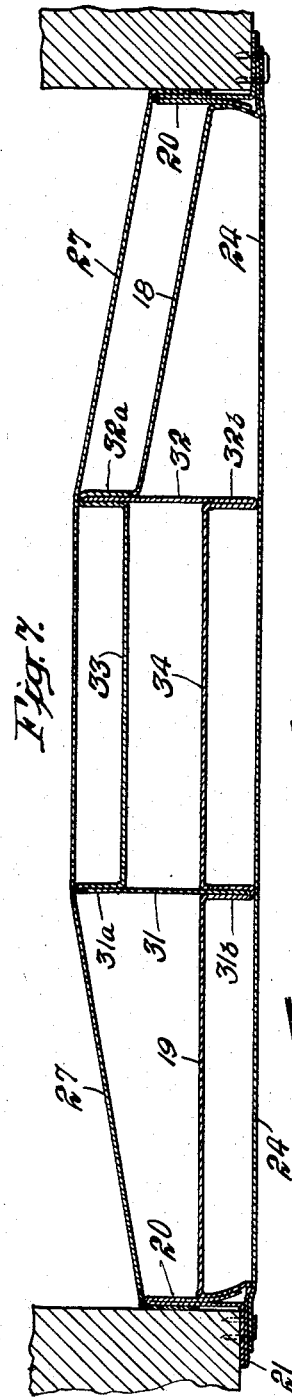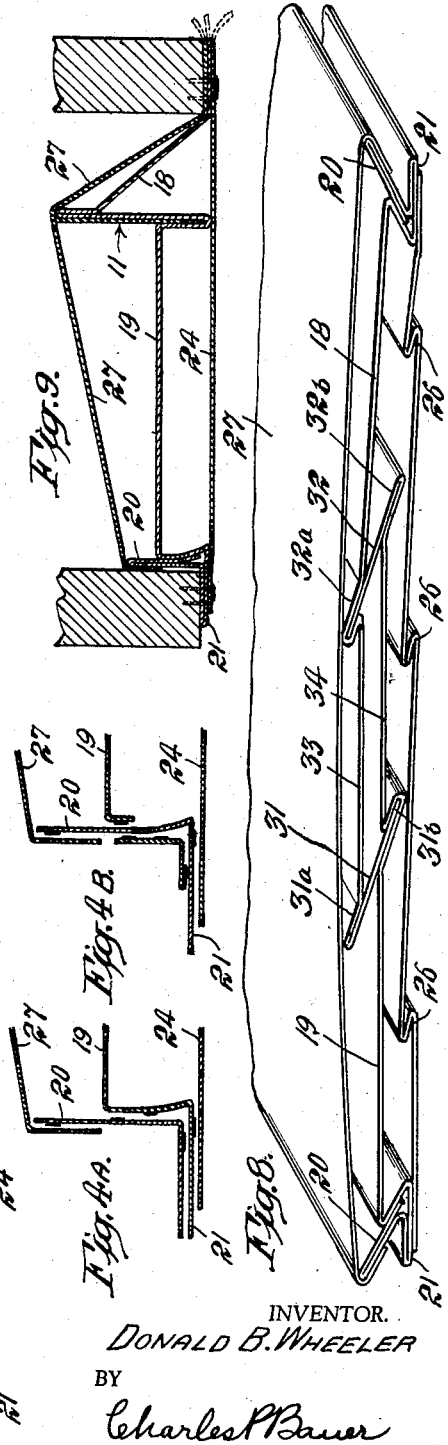

March 31, 1959  D. B. WHEELER  2,879,554
HEAT REFLECTIVE INSULATION
Filed Nov. 28, 1958  4 Sheets—Sheet 4
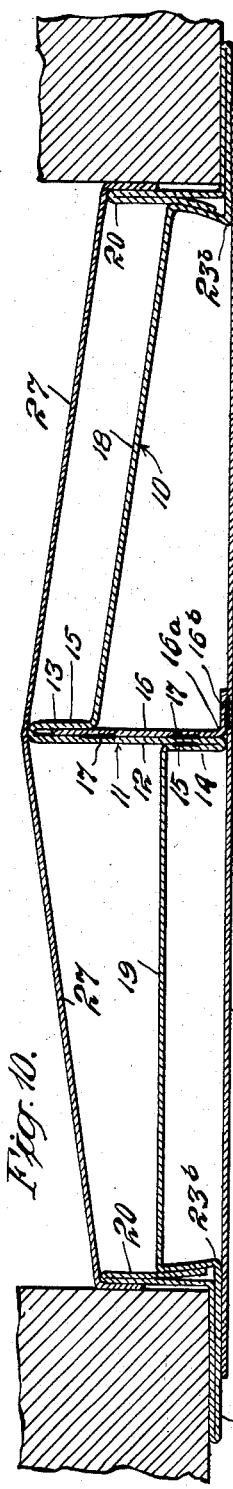
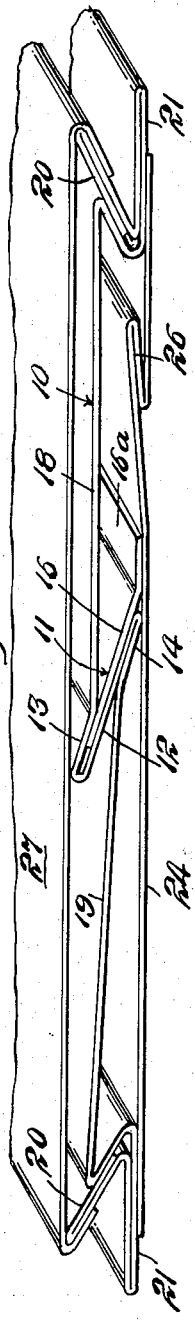
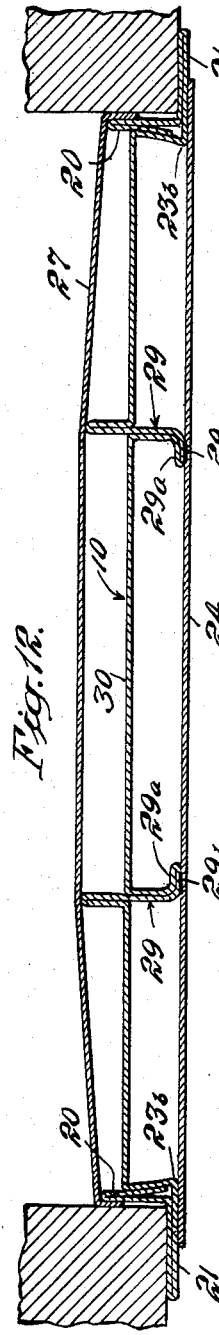
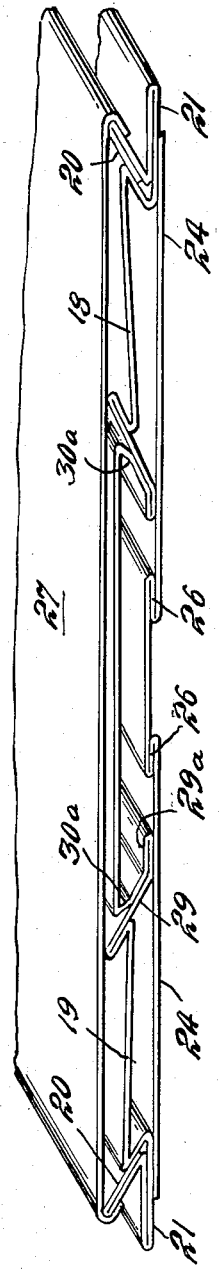
INVENTOR.
DONALD B. WHEELER
BY
Charles P. Bauer
ATTORNEY

United States Patent Office 2,879,554
Patented Mar. 31, 1959

2,879,554
HEAT REFLECTIVE INSULATION

Donald B. Wheeler, Hudson Falls, N.Y., assignor to Union Bag-Camp Paper Corporation, New York, N.Y., a corporation of Virginia Application November 28, 1958, Serial No. 778,047

28 Claims. (Cl. 20—4)

The present invention relates to a heat reflective insulation. More particularly it covers an insulation which can be made up in collapsed form and can be conveniently expanded and mounted in a building to provide a minimum of two and a maximum of four layers of air spaces, each of which may have a reflective surface.

This application is a continuation-in-part of my copending application, Serial No. 665,821, filed June 14, 1957, and a continuation-in-part of my copending application Serial No. 720,873, filed March 12, 1958.

There are now in use collapsed reflective insulations of this type but they have certain inherent disadvantages. One type has poor insulating qualities near both edges, cannot be mounted inside of supports or studs to provide more than three layers of air spaces in a portion of the space between studs, and is not designed to give full expansion at all times. Another type can be fastened to sides of studs to provide in effect four layers of air spaces, but the layers of the insulation do not have full insulating value because the cross members create a blocking action in such layers. Of course it is possible to use a single reflective foil and build up a series of layers between the studs, but this is time consuming and expensive.

The reflective insulation of the present invention overcomes the disadvantages found in the other types of insulation and retains the good qualities of each, i.e., it completely fills the space between the studs and has uniform insulating quality throughout such space, it can be mounted in between the studs to give a maximum of four layers of air spaces with a heat reflective surface in each, it is easy to handle and can be shipped in roll or flat form, and it can be effectively mounted between studs which do not have standard spacing since it can be nailed part way across.

It is a further object of the invention to provide an insulation of the character stated which is simple in design for the intended purpose, rugged in construction, and economical to manufacture.

Other objects of the invention will in part be obvious and will in part appear hereinafter.

The invention accordingly comprises an article of manufacture possessing the features, properties, and the relation of elements which will be exemplified in the article hereinafter described and the scope of the invention which will be indicated in the claims.

For a fuller understanding of the nature and objects of the invention, reference should be had to the following detailed description taken in connection with the accompanying drawings, in which:

Figure 1 is a sectional view of the expanded insulation positioned between supports and secured to the ends of such supports;

Figure 2 is a sectional view similar to Figure 1 except that the insulation is secured to the sides of the supports;

Figure 3 is a perspective view of the insulation showing the manner of folding to a collapsed form;

Figure 4 is an enlarged section view of one edge of the expanded insulation with the sheets separated to show the folding and assembly;

Figure 4A is a sectional view similar to Figure 4 showing a modified form of end post and brace;

Figure 4B is a sectional view similar to Figure 4 showing a further modified form of end post and brace;

Figure 5 is a sectional view showing the various sheets secured together and the form of the insulation with respect to the end of the support;

Figure 5A is a sectional view similar to Figure 5 showing the form of the insulation with respect to the side of the support;

Figure 6 is a sectional view, corresponding to Figure 1, showing a modified form of insulation in which the center spacing member has spaced upright posts connected by a single longitudinal spacer;

Figure 7 is a sectional view similar to Figure 6 showing a further modified form of insulation in which the center spacing member has spaced upright posts connected by parallel longitudinal spacers;

Figure 8 is a perspective view of the insulation of Figure 7 showing the manner of folding to a collapsed form;

Figure 9 is a sectional view similar to Figure 1 showing the manner of mounting the insulation when there is narrow spacing between supports;

Figure 10 is a sectional view, corresponding to Figure 1, showing a modified form of insulation in which the vertical post of the center spacing member is secured to the face sheet;

Figure 11 is a perspective view of the insulation of Figure 10 showing the manner of folding to a collapsed form;

Figure 12 is a sectional view, corresponding to Figure 10, showing a further modified form of insulation in which the center spacing member has spaced upright posts connected by a longitudinal spacer; and Figure 13 is a perspective view of the insulation of Figure 12 showing the manner of folding to a collapsed form.

Referring more particularly to the drawings, there is shown in Figure 1 a paper sheet 10 which is reverse folded at or near the center to provide a center spacing member 11 consisting of a vertical post 12 with back and face fins 13 and 14 at each end. These fins are formed by lines of adhesive 15 adjacent the bases of the fins, which bases are spaced from each other to enable the post 12 to assume a vertical position when the completed insulation is opened up as hereinafter described. The post 12 has been stiffened by the addition of a reinforcing strip 16. In cases where the insulation is used under conditions of prolonged high humidity, such strip prevents the post from curling or buckling after the insulation has been mounted in a building. Under certain conditions such strip will not be necessary, in which case such post will appear as one of the two vertical center posts shown in Figure 6. Such strip is secured by lines of adhesive 17.

The sheet 10 is projected from the bases of the fins to provide lateral spacers 18 and 19, and is then folded as shown in Figure 4 to form end posts 20 and stapling flanges 21. The end posts and flanges are of double thickness except at the lower halves of the posts which are of triple thickness, and are held together by suitable lines of adhesive 22a, 22b, 22c, and 22d. Such sheet 10 is terminated on the end posts 20 near the bases of such posts to add rigidity and compression strength when the insulation is opened. The folds and pasting, particularly in the area on each side of the juncture between the end posts 20 and the flanges 21, should be noted in Figures 4 and 5. In this area the flanges have two walls and the posts have three walls with the juncture line 23a of the outer walls spaced outwardly from the juncture line 23b of the inner walls. Furthermore, the lines of adhesive 22b and 22c, spaced on each side from the juncture lines, hold the inner and outer walls in fixed position with relation to each other. This construction creates a brace of substantially triangular form in such area so that each end post 20 tends to rotate outwardly toward the adjacent flange 21 which rotation keeps the back sheet in taut condition between the posts as hereinafter described.

A face sheet 24 extends between the bases of the end posts 20 and is secured on each side to the stapling flange 21 by a line of adhesive 25. This sheet is provided with suitable center folds or tucks 26 (Figure 3) so that the flanges 21 can be moved inwardly when the insulation is collapsed, but the sheet will be taut between the flanges when the insulation is opened. It may be advantageous to run the face reflective sheet to the outer edges of the stapling flanges, so that the ends of the supports will be completely covered with heat reflective sheets. This provides an effective continuous moisture vapor barrier across the entire surface of an area when the insulation is mounted in adjacent spaces and overlapped on the ends of the supports. Similarly a back sheet 27 extends between the tops of the end posts 20 and is secured on each side to the post by a line of adhesive 28. This sheet is of proper width so that it is taut between the posts when the insulation is opened. It has been found advantageous to have the face sheet of heavier weight than the back sheet because the face sheet is subject to greater strains when expanding and mounting the insulation. Furthermore, if the back sheet is of light weight it does not have a tendency to sag between the spaces and hence affect the insulating efficiency. The heat reflective sheets 24 and 27 may be made of any suitable material which will reflect heat but will not be too heavy for the insulation described.

Although aluminum foil has been preferred, it will be understood that other heat reflective foils, laminates thereof, metalized sheets, or the like are satisfactory. The face sheet could also be made of paper or a suitable moisture vapor barrier material, such as polyethylene, asphalt coated paper, duplex foil laminate, or the like. In such case one or two of the air spaces, depending upon method of application, will be non-reflective but will maintain the insulating value of a non-reflective air space.

Referring to Figure 3, it will be seen that the insulation of the present invention is so folded and scored that it can be collapsed which permits it to be put into roll or flat form for shipment to users. This is important from a manufacturing standpoint because the insulation can be fabricated in a continuous operation. It should be further noted that the manner of construction so distributes the folds and sheets that substantially equal thickness is maintained in the collapsed product over the entire width of the insulation which allows easy rolling to large diameters. When the insulation reaches its destination, it can be cut to the desired length, stapled or nailed to one support for its full length in the manner shown in either Figure 1 or Figure 2, and then pulled into the opened form shown in either Figure 1 or Figure 2 as it is stapled or nailed to the adjacent support. Although this insulation is particularly suited for ceilings or roofs of buildings, it should be understood that it is also effective and useful for the walls, floors and other cavities formed by building construction.

During the opening of this insulation from its collapsed state, the one flange is usually secured in fixed position and tension is then applied to the opposite flange. Such tension causes the tucks 26 in the face sheet 24 to flatten out until such sheet is taut. At the same time the back sheet 27 tends to pull the end posts into upright position, but the triangular braces located between the end posts 20 and the stapling flanges 21 resist rotation of the end posts thereby keeping the back sheet taut. The pulling of the end posts into upright position applies tension to the longitudinal spacers 18 and 19, which causes the center post 12 to rotate about its approximate median line and assume the vertical position shown in Figure 1. As the center post assumes its upright position, the back fin 13 of such post presses against the back sheet, which further tends to keep the back sheet taut but relieves some of the load from the end posts. It is the combination of the triangular brace and the center post which causes the end posts to rotate toward the insides of the studs and thereby gives full insulation over the entire area between the supports as shown in Figures 1 and 2.

Particular attention should be directed to the triangular brace between the end posts and the stapling flanges when the insulation is opened into expanded form. By spacing the juncture lines 23a and 23b of the inner and outer walls and securing such walls together along lines spaced on each side from the juncture lines, there is created a triangle at the base of each post. As illustrated by the enlarged views of Figures 4 and 5, such triangle consists of a right angle or obtuse angle formed by the outer wall of the post and the stapling flange, an acute angle formed by the inner wall of the post and the stapling flange, and another acute angle formed by the outer and inner walls of the post. When the post is in upright position, it will be seen that the side of the triangle formed by the inner wall of the post serves as a compression member and that the side of the triangle formed by the outer wall of the post serves as a tension member. This triangle not only maintains the top of each end post in contact with the side of the support but achieves this result without breaking or scoring the inner and outer walls of the post. Although such walls may be curved between their bases and tops when the insulation is expanded and mounted between the posts, the absence of a break or score serves to prevent the posts from bending, sagging or laying over and to maintain the posts in position against the supports. It will be seen in Figure 5 that the line 23b of the triangle projects slightly beyond the end of the support and that the face sheet 24 is not in the same plane as the flange 21. However, when the wallboard is applied over the ends of the supports, as shown in Figure 1, the line 23b on each side is forced inward so that the face sheet and flange are in the same plane. This also tends to apply pressure to the compression member of the triangle and assist in maintaining the end posts against the sides of the supports.

Figures 4A and 4B illustrate two of the various modifications which may be used for the end post and the triangular brace. Each of these is achieved by inserting extra sheets of paper rather than folding the single sheet as heretofore described.

In some buildings the supports are spaced farther apart than normal and the insulation shown in Figure 1 may not be satisfactory because the reflective sheets must span too great a distance between the posts. In such cases it has been found desirable to vary the center spacing member to provide two center posts, as shown in Figures 6, 7 and 8. With the exception of the change in such center spacing member, the end posts, reflective sheets and lateral spacers are the same as heretofore described.

Referring to Figure 6, it will be seen that the sheet 10 is reverse folded at or near the center to provide a center spacing member consisting of two vertical posts 29 each with back and face fins at each end. The construction of each of these posts is the same as the post 12 shown in Figure 1, except that no reinforcing strip has been included. These two posts are connected together by a tie spacer 30. As in the case of the post of Figure 1, each post 29 has one spacer secured to it along a line above the approximate median line of the post and the other spacer secured to it along a line below the approximate median line of the post. This form of insulation is collapsed in substantially the same manner as the insulation shown in Figure 3, except that each of the two posts is laid over and assumes the position of the center post in the insulation of Figure 3. When the insulation is expanded as heretofore described, the tension on the lateral spacers 18 and 19 and the tie spacer 30 causes the posts 29 to rotate about their approximate median lines and assume the vertical positions shown in Figure 6. The top fins of the posts press against the back sheet along spaced lines and thus provide additional support for the longer span in this modified form.

Referring to Figure 7, the center spacing member has been modified to provide two vertical posts 31 and 32 connected by two parallel tie spacers 33 and 34, such posts and spacers constituting the sides of a parallelogram. This is accomplished by reverse folding the paper sheet of the lateral spacer 18 to form back fin 32a of post 32, projecting the sheet laterally a short length as tie spacer 33, reverse folding the sheet to form back fin 31a of post 31, projecting the sheet downwardly as post 31, and terminating the sheet between the folds of the face fin of post 31. Similarly another paper sheet which is a continuation of lateral spacer 19 is reverse folded to form face fin 31b of post 31, is projected laterally a short length as tie spacer 34, is reverse folded to form face fin 32b of post 32, and is terminated between the folds of the back fin 32a. The fins, posts and spacers of the center spacing member are secured together by suitable lines of adhesive as heretofore described.

The modified insulation shown in Figure 7 is collapsed by laying over the various posts and reverse folding the face sheet at the tucks 26 in the manner shown in Figure 8. When this form of insulation is expanded as heretofore described, the tension on the lateral spacers 18 and 19 and tie spacers 33 and 34 causes the posts 32 and 31 to rotate about their approximate median lines and assume the vertical positions shown in Figure 7. As in the other modified form of Figure 6, the double center posts provide additional support for the longer spans in the reflective sheets. The modified forms may also be mounted in the same way as the insulation shown in Figure 2.

In some cases it has been found desirable to anchor the vertical post or posts of the center spacing member to the face sheet. This permits the member to rotate about the anchor line and facilitates the opening of the insulation. Such insulation, which has all the insulating qualities and mounting advantages of the insulation heretofore described, is illustrated in Figures 10 to 13 inclusive.

Referring to Figure 10 it will be noted that the reinforcing strip 16 is made longer than the post 12 to provide an edge portion 16a which is anchored by a line of adhesive 16b to the face sheet 24. In the event the reinforcing strip 16 is not used, as mentioned above, the post 12 is extended to provide an edge portion which can be secured to the face sheet. The post will then appear as one of the two vertical center posts shown in Figure 12. This form of insulation is collapsed in substantially the same manner as the insulation shown in Figure 3 and assumes the form shown in Figure 11. When the insulation is expanded, as heretofore described, the tension on the opposite flanges causes the tuck 26 in the face sheet 24 to flaten out until such sheet is taut. At the same time the back sheet 27 tends to pull the end posts into upright position and the outward pressure of the end post 20 keeps the back sheet taut. The pulling of the end posts into upright position applies tension to the longitudinal spacers 18 and 19 which causes the center post 12 to rotate about the line along which it is anchored to the face sheet and assume the vertical position shown in Figure 10.

The insulation shown in Figure 12 follows that illustrated in Figure 6 except that the two vertical posts 29 of the center spacing member are extended to provide an edge portion 29a which is anchored by a line of adhesive 29b to the face sheet 24. These two posts are connected together by a tie spacer 30 with a fold 30a at each end for collapsing as hereinafter described. Each post 29 has one spacer secured to each side of it with the three spacers in substantially the same plane. Although the construction described and shown opens efficiently and provides uniform insulation layers, it will be understood that the lines of connection of the spacers to the posts can be moved up or down provided the spacers give ample tension to raise the posts when the insulation is expanded. This form of insulation is collapsed as shown in Figure 13 with the posts 29 laid over in opposite directions toward the end posts. To accomplish this, tucks 26 are placed in the face sheet between the posts 29, and the folds 30a in the tie spacer 30 are laid against the posts 29. When the insulation is expanded as heretofore described, the tension on the lateral spacers 18 and 19 and the tie spacer 30 causes each post 29 to rotate about the line along which it is anchored to the face sheet and assume the vertical position shown in Figure 12.

It should be noted that the mounting of the insulation in between the supports or studs, as illustrated in Figure 2, provides the following four layers of air spaces with a heat reflective surface in each:

(1) Between the inner wall or ceiling and reflective sheet 24.

(2) Between the reflective sheet 24 and the spacers (lateral alone or lateral and tie spacers).

(3) Between the spacers and the reflective sheet 27.

(4) Between the reflective sheet 27 and the outer wall, roof, or attic floor.

Furthermore, the rotation of the end posts outwardly toward the insides of the supports or studs, as explained above, cause the insulation of the present invention to give full insulation over the entire area between the supports.

Odd widths of framing may occasionally occur and the insulation is wider than the spacing between the supports. In such case the insulation may be mounted as shown in Figure 9. This will allow the retention of the reflective air spaces. The portion remaining beyond the stapled line may be cut off with a scissors or folded flush with the surface and allowed to remain, as it will be covered by the finish wall surface.

Since certain changes may be made in the above article, and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A heat reflective insulation in expanded form comprising spaced upright end posts having inner and outer walls at the lower portion thereof, face and back sheets at least one of which is reflective extending in flat form between respectively the bases and tops of the posts, a center spacing member positioned between the end posts and in contact with the back sheet, and lateral spacers having their outer edges secured to the end posts along lines spaced between the back and face sheets and their inner edges secured to the center spacing member along lines respectively above and below the median of the said member, and stapling flanges each connected to an end post by spaced juncture lines, the spacing of said juncture lines being formed by folding inner and outer walls respectively of said end posts at the face sheet and at said flanges, the folding of said inner and outer walls of said end posts at said face sheet and at said flanges forming braces and said spaced juncture lines and braces tending to rotate said end posts toward the flanges, thereby maintaining the upper portions of the end posts in contact with the building supports and the center spacing member through the said spacers in upright position to provide layers of air spaces.

2. The insulation of claim 1 in which the center spacing member comprises an upright center post.

3. The insulation of claim 2 in which the upright center post is of double thickness.

4. The insulation of claim 1 in which the center spacing member comprises two spaced upright center posts connected together by a tie spacer positioned between the back and face sheets, said tie spacer being secured to the center posts along lines on the sides of the median opposite to the sides bearing the lines along which the lateral spacers are secured.

5. The insulation of claim 1 in which the center spacing member comprises two upright center posts connected by parallel tie spacers positioned between the back and face sheets, said tie spacers and center posts forming generally a parallelogram.

6. A heat reflective insulation of extended length in flat form laterally comprising spaced stapling flanges adapted for attachment to the adjacent supports in a building, end posts having inner and outer walls at the lower portion thereof, each of said posts being hingedly connected to the inner edge of a flange along spaced juncture lines which tend to rotate the post toward the flange, face and back sheets at least one of which is reflective extending in flat form between respectively the bases and tops of the end posts, a center spacing member, said face sheet being provided with a longitudinal tuck, lateral spacers each secured along its outer edge to the end post along a line spaced between the back and face sheets and along its inner edge to said center spacing member, such spacers being secured to such member along lines respectively above and below the median of the member, said end posts being folded inwardly flatwise against the back sheet and lateral spacers, said face sheet being folded along a longitudinal tuck to lie flat, said flanges being folded flatwise against the end posts, the folding of said inner and outer walls of said end posts at said face sheet and at said flanges forming braces at folded juncture lines upon application of tension to said flanges, said spacing member being rotated against the lateral spacers whereby said member and spacers lie flat between the sheets, the said sheets and combined lateral spacers being of substantially the same length between the posts whereby the application of outward tension on the stapling flanges will cause the posts and center spacing member to assume upright positions and the sheets and spacers to separate into layers of air spaces with the upper portions of the end posts in contact with the building supports.

7. The insulation of claim 6 in which the center spacing member comprises an upright center post.

8. The insulation of claim 7 in which the upright center post is of double thickness.

9. The insulation of claim 6 in which the center spacing member comprises two spaced upright center posts connected together by a tie spacer positioned between the back and face sheets, said tie spacer being secured to the center posts along lines on the sides of the median opposite to the sides bearing the lines along which the lateral spacers are secured.

10. The insulation of claim 6 in which the center spacing member comprises two upright center posts connected together by parallel tie spacers positioned between the back and face sheets, said tie spacers and center posts forming generally a parallelogram.

11. A heat reflective insulation in expanded form comprising spaced upright end posts having inner and outer walls at least at the lower portions of such posts, face and back sheets at least one of which is reflective extending in flat form between respectively the bases and tops of the posts, a center spacing member positioned between the end posts and in contact with the back sheet, and lateral spacers having their outer edges secured to the end posts along lines spaced between the back and face sheets and their inner edges secured to the center spacing member along lines respectively above and below the median of the said member, and stapling flanges each integral with an end post and formed by folding each wall of said post outwardly along a juncture line which is spaced from the juncture line of the other wall, said lines being retained in spaced relation by securing together the walls of the end posts and the walls of the flanges along attachment lines spaced from the juncture lines to provide a brace of substantially triangular form in the area where the post joins the flange, which spaced lines and brace tend to rotate each post toward the flange, thereby maintaining the upper portions of the end posts in contact with the building supports and the center spacing member through the said spacers in upright position to provide layers of air spaces.

12. The insulation of claim 11 in which the inner wall of each end post is of double thickness.

13. A heat reflective insulation in expanded form for attachment to the adjacent supports in a building comprising spaced upright end posts having inner and outer walls at the lower portions of such posts, face and back sheets at least one of which is reflective extending in flat form between respectively the bases and tops of the posts, and stapling flanges connected to the end posts, the outer wall of each post connected to the adjacent flange along a juncture line spaced from the juncture line along which the inner wall is connected to the flange, said inner and outer walls of each post being secured together along an attachment line spaced from the juncture lines to provide a brace of substantially triangular form in the area where the walls of the post join the flange, which braces maintain the upper portions of the posts in contact with the sides of the building supports and the sheets in taut spaced relationship.

14. The insulation of claim 13 comprising a lateral spacer having its outer edges secured to the end posts along lines spaced between the face and back sheets to provide two spaced layers between such sheets.

15. The insulation of claim 14 in which the lateral spacer is provided with means positioned between the end posts and supporting the center portion of the back sheet.

16. A heat reflective insulation of extended length in flat form laterally comprising spaced stapling flanges adapted for attachment to the adjacent supports in a building, end posts each having inner and outer walls at the lower portions of such post hingedly connected to the inner edge of a flange, and face and back sheets at least one of which is reflective extending in flat form between respectively the bases and tops of the end posts, said face sheet being provided with a longitudinal tuck, the outer wall of each post connected to the adjacent flange along a juncture line spaced from the juncture line along which the inner wall is connected to the flange, said inner and outer walls of each post being secured together along an attachment line spaced from the juncture lines to provide a brace of substantially triangular form in the area where the walls of the post join the flange when the insulation is expanded, said end posts being folded flatwise against the back sheet, said face sheet being folded along a longitudinal tuck to lie flat, said flanges being folded flatwise against the end posts, the said sheets being of substantially the same length between the posts, whereby the application of outward tension on the stapling flanges will cause the posts to assume upright positions and the braces will maintain the upper portions of the end posts in contact with the building supports and the sheets in taut spaced relationship.

17. A heat reflective insulation in expanded form comprising spaced stapling flanges adapted for attachment to the adjacent supports in a building, spaced upright end posts having their bases connected to the flanges and their upper portions in contact with the sides of the supports, face and back sheets at least one of which is reflective extending in flat form between respectively the bases and tops of the posts, an upright center spacing member positioned between the end posts and in contact with the back sheet, and lateral spacers having their outer edges secured to the end posts along lines spaced between the back and face sheets and their inner edges secured to the center spacing member along lines respectively above and below the median of the said member, thereby causing said upright center spacing member to rotate in substantial alignment with said end posts upon outwardly tensioning the stapling flanges at the end posts to keep the back sheet taut and distribute the load from the end posts, which spacers provide layers of air spaces between the supports.

18. The insulation of claim 17 in which the center spacing member comprises an upright center post.

19. The insulation of claim 18 in which the upright center post is of double thickness.

20. The insulation of claim 17 in which the center spacing member comprises two spaced upright center posts connected together by a tie spacer positioned between the back and face sheets, said tie spacer being secured to the center posts along lines on the sides of the median opposite to the sides bearing the lines along which the lateral spacers are secured.

21. The insulation of claim 17 in which the center spacing member comprises two spaced upright center posts connected together by parallel tie spacers positioned between the back and face sheets, said tie spacers and center posts forming generally a parallelogram.

22. A heat reflective insulation of extended length in flat form laterally comprising spaced stapling flanges adapted for attachment to the adjacent supports in a building, end posts, each of said end posts being hingedly connected to a flange and adapted to rotate toward the flange, face and back sheets at least one of which is reflective extending in flat form between respectively the bases and tops of the end posts, a center spacing member, said face sheet being provided with a longitudinal tuck, lateral spacers each secured along its outer edge to the end post along a line spaced between the back and face sheets and along its inner edge to said center spacing member, such spacers being secured to such member along lines respectively above and below the median of the member, said end posts being folded inwardly flatwise against the back sheet and lateral spacers, said face sheet being folded along a longitudinal tuck to lie flat, said flanges being folded flatwise against the end posts, said spacing member being rotated against the lateral spacers whereby said members and spacers lie flat between the sheets, the said sheets and combined lateral spacers being of substantially the same length between the posts whereby the application of outward tension on the stapling flanges will cause the posts and center spacing member to assume upright positions, thereby keeping the back sheet taut and distributing the load from the end posts and causing the sheets and spacers to separate into layers of air spaces between the supports.

23. A heat reflective insulation in expanded form comprising spaced stapling flanges adapted for attachment to the adjacent supports in a building, spaced upright end posts having their bases connected to the flanges and their upper portions in contact with the sides of the supports, face and back sheets at least one of which is reflective extending in flat form between respectively the bases and tops of the posts, an upright center spacing member positioned between the end posts and having a top edge in contact with the back sheet and a base edge secured to the face sheet, and lateral spacers having their outer edges secured to the end posts along lines spaced between the back and face sheets and their inner edges secured to the center spacing member along lines spaced between the back and face sheets, thereby causing said upright center spacing member to rotate in substantial alignment with said end posts upon outwardly tensioning the stapling flanges at the end posts to keep the back sheet taut and distribute the load from the end posts, which spacers provide layers of air spaces between the supports.

24. The insulation of claim 23 in which the center spacing member comprises an upright center post.

25. The insulation of claim 24 in which the upright center post is of double thickness.

26. The insulation of claim 23 in which the center spacing member comprises two spaced upright center posts connected together by a tie spacer positioned between the back and face sheets, said tie spacer being secured to the center posts along lines substantially opposite the lines along which the lateral spacers are secured to the center posts.

27. The insulation of claim 23 in which the center spacing member comprises two spaced upright center posts connected together by a tie spacer, said tie spacer being secured to the center posts along lines spaced between the back and face sheets and above the lines along which the lateral spacers are secured to the center posts.

28. A heat reflective insulation of extended length in flat form laterally comprising spaced stapling flanges adapted for attachment to the adjacent supports in a building, end posts, each of said end posts being hingedly connected to a flange and adapted to rotate toward the flange, face and back sheets at least one of which is reflective extending in flat form between respectively the bases and tops of the end posts, said face sheet being provided with a longitudinal tuck, a center spacing member positioned between the end posts and having a top edge in contact with the back sheet and a base edge secured to the face sheet, lateral spacers each secured along its outer edge to the end post along a line spaced between the back and face sheets and along its inner edge to the said center spacing member along a line spaced between the back and face sheets, said end posts being folded inwardly flatwise against the back sheet and lateral spacers, said face sheet being folded along the tuck to lie flat, said flanges being folded flatwise against the end posts, said center spacing member being rotated against the lateral spacers whereby said member and spacers lie flat between the sheets, the said sheets and combined lateral spacers and member being of substantially the same length between the posts whereby the application of outward tension on the stapling flanges will cause the posts and center spacing member to assume upright positions, thereby keeping the back sheet taut and distributing the load from the end posts and causing the sheets and spacers to separate into layers of air spaces between the supports.

No references cited.